United States Patent
Gorman et al.

(10) Patent No.: US 7,886,188 B2
(45) Date of Patent: Feb. 8, 2011

(54) SYSTEM AND METHOD FOR DISTRIBUTED MONITORING OF A SOAP SERVICE

(75) Inventors: Bradley Matthew Gorman, Clarkson (AU); Luke Rowan McKenna, Bentley (AU); Andrew Wilkins, Mount Lawley (AU); Peter Gareth Woodward, Perth (AU)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 11/942,767

(22) Filed: Nov. 20, 2007

(65) Prior Publication Data

US 2009/0132856 A1   May 21, 2009

(51) Int. Cl.
 *G06F 11/00* (2006.01)
(52) U.S. Cl. .......................................... 714/25; 714/38
(58) Field of Classification Search ........................ None
 See application file for complete search history.

(56) References Cited

U.S. PATENT DOCUMENTS

| | | | | |
|---|---|---|---|---|
| 2004/0030947 | A1* | 2/2004 | Aghili et al. | 714/1 |
| 2008/0109681 | A1* | 5/2008 | De Pauw et al. | 714/38 |
| 2009/0006897 | A1* | 1/2009 | Sarsfield | 714/38 |

\* cited by examiner

*Primary Examiner*—Michael C Maskulinski
(74) *Attorney, Agent, or Firm*—Yee & Associates, P.C.; Jeffrey S. LaBaw

(57) ABSTRACT

A computer implemented method, apparatus, and computer usable program code for the distributed monitoring of a SOAP service is provided. A test configuration file specifying a test input is distributed from a central reporting location to at least one remote data processing system that has access to a SOAP service to be tested. The test configuration file is created without accessing the SOAP service to be tested. Furthermore, the user that created the test configuration file is not allowed access to the SOAP service to be tested.

17 Claims, 4 Drawing Sheets

SYSTEM AND METHOD FOR DISTRIBUTED MONITORING OF A SOAP SERVICE

BACKGROUND OF THE INVENTION

1. Field of the Invention

The present invention relates generally to data processing systems. More specifically, the present invention relates to a method, system and computer program product for the distributed monitoring of a SOAP service.

2. Description of the Related Art

Many web-based Service Oriented Architectures utilize a SOAP API (application program interface) for providing services. SOAP is a protocol for exchanging XML-based messages over computer networks. Testing of this SOAP API is usually performed by the SOAP API designer, using manual testing tools that are heavily user-interactive. Once the initial testing is complete and passed, the SOAP API is then deployed across the production environment.

Several problems exist with this type of testing. For example, direct network access to the SOAP API for testing is required during the development phase of the test. This is required due to the interactive nature of the test development. This is a particular problem because direct network access is often unattainable from the test development location due to network/security restrictions. For example, a test engineer in Bangalore, India may not have access to a web service provided on an intranet in the United States. Additionally, if the SOAP service is to be made available across a wide network, there is often no testing of the SOAP service performance, availability and correctness from broad distributed locations. A solution is required to address the shortcomings of current SOAP API testing methods.

SUMMARY OF THE INVENTION

A computer implemented method, apparatus, and computer usable program code for the distributed monitoring of a SOAP service is provided. A test configuration file specifying a test input is distributed from a central reporting location to at least one remote data processing system that has access to a SOAP service to be tested. The test configuration file is created without accessing the SOAP service to be tested. Furthermore, the user that created the test configuration file is not allowed access to the SOAP service to be tested.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
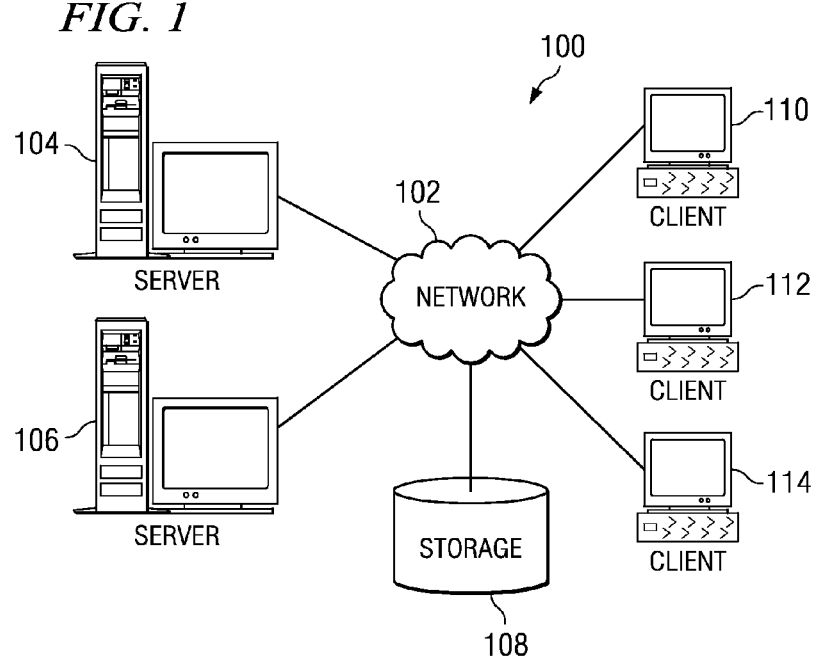
FIG. 1 depicts a pictorial representation of a network of data processing systems in which illustrative embodiments may be implemented.
Figure 2:
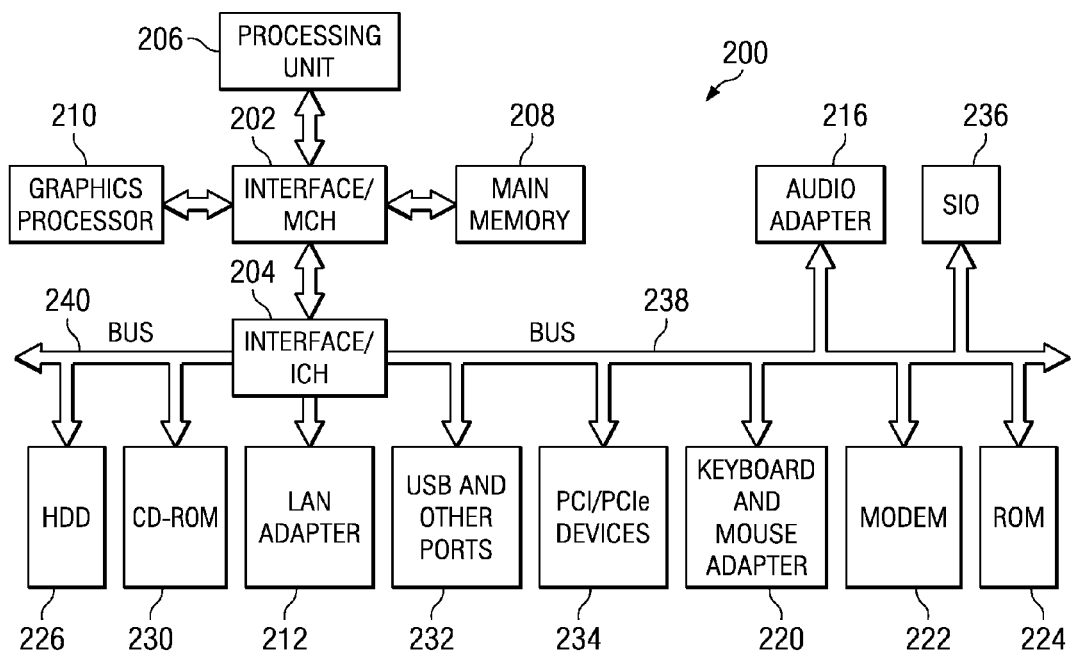
FIG. 2 is a block diagram of a data processing system is shown in which illustrative embodiments may be implemented.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including interface and memory controller hub (interface/MCH) 202 and interface and input/output (I/O) controller hub (interface/ICH) 204. Processing unit 206, main memory 208, and graphics processor 210 are coupled to interface and memory controller hub 202. Processing unit 206 may contain one or more processors and even may be implemented using one or more heterogeneous processor systems. Graphics processor 210 may be coupled to the interface/MCH through an accelerated graphics port (AGP), for example.

In the depicted example, local area network (LAN) adapter 212 is coupled to interface and I/O controller hub 204 and audio adapter 216, keyboard and mouse adapter 220, modem 222, read only memory (ROM) 224, universal serial bus (USB) and other ports 232, and PCI/PCIe devices 234 are coupled to interface and I/O controller hub 204 through bus 238, and hard disk drive (HDD) 226 and CD-ROM 230 are coupled to interface and I/O controller hub 204 through bus 240. PCI/PCIe devices may include, for example, Ethernet adapters, add-in cards, and PC cards for notebook computers. PCI uses a card bus controller, while PCIe does not. PCI (Peripheral Component Interconnect) is a type of computer bus architecture for attaching peripheral devices. PCIe (PCI Express) is a computer expansion card interface format that is structured around point to point full duplex serial links called lanes rather than a bus. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to interface and I/O controller hub 204.

An operating system runs on processing unit 206 and coordinates and provides control of various components within data processing system 200 in FIG. 2. The operating system may be a commercially available operating system such as Microsoft® Windows Vista™ (Microsoft and Windows Vista are trademarks of Microsoft Corporation in the United States, other countries, or both). An object oriented programming system, such as the Java™ programming system, may run in conjunction with the operating system and provides calls to the operating system from Java™ programs or applications executing on data processing system 200. Java™ and all Java™-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1 and 2 and above-described examples are not meant to imply architectural limitations. For example, data processing system 200 also may be a tablet computer, laptop computer, or telephone device in addition to taking the form of a PDA.

Exemplary embodiments provide for driving a group of distributed test engines, called SOAP monitors, from a single location that perform correctness and performance tests on SOAP interfaces. The single location may be local or remote. Exemplary embodiments allow a provider to configure a range of tests to be executed by one or more test engineers that are located in different locations. The tests are developed without the need to have network access to the web service.

Exemplary embodiments cure the deficiencies of the prior art in regards to SOAP API testing methods. Exemplary embodiments replace the interactive creation of the test by allowing the designer to write the tests using the web services description file associated with the SOAP API. Designers obtain a WSDL (Web Service Description Language) description file either by already having the file as a result of creating the server interface, or designers may retrieve the file from the live service, or designers may obtain the file from the original service developer. This manual test creation does not require live interaction with the web site. Thus, tests can be automatically deployed across a distributed testing infrastructure with no additional configuration of the tests required. These tests then report back to a central location on the correctness, performance metrics, and alerts. Once the WSDL file is obtained, a trained SOAP professional developer can create the required tests without having or needing access to the network hosting the web service that requires testing.

Each test consists of connection details for the SOAP service, the location of a WSDL file, the operation to be performed, a list of inputs and outputs, specified as a name, value, and type, and a set of service level classification criteria, such as for example, but not limited to, the test fails if it takes longer than X seconds or results name Y does not contain value Z, and so forth. This assumes that the user has knowledge of the service and WSDL. When the SOAP monitor is started, the specified tests are run repeatedly at a specified polling interval. This allows a provider of a SOAP service to verify that the interface accepts expected values, returns expected results and is performing acceptably over time.

Figure 3:
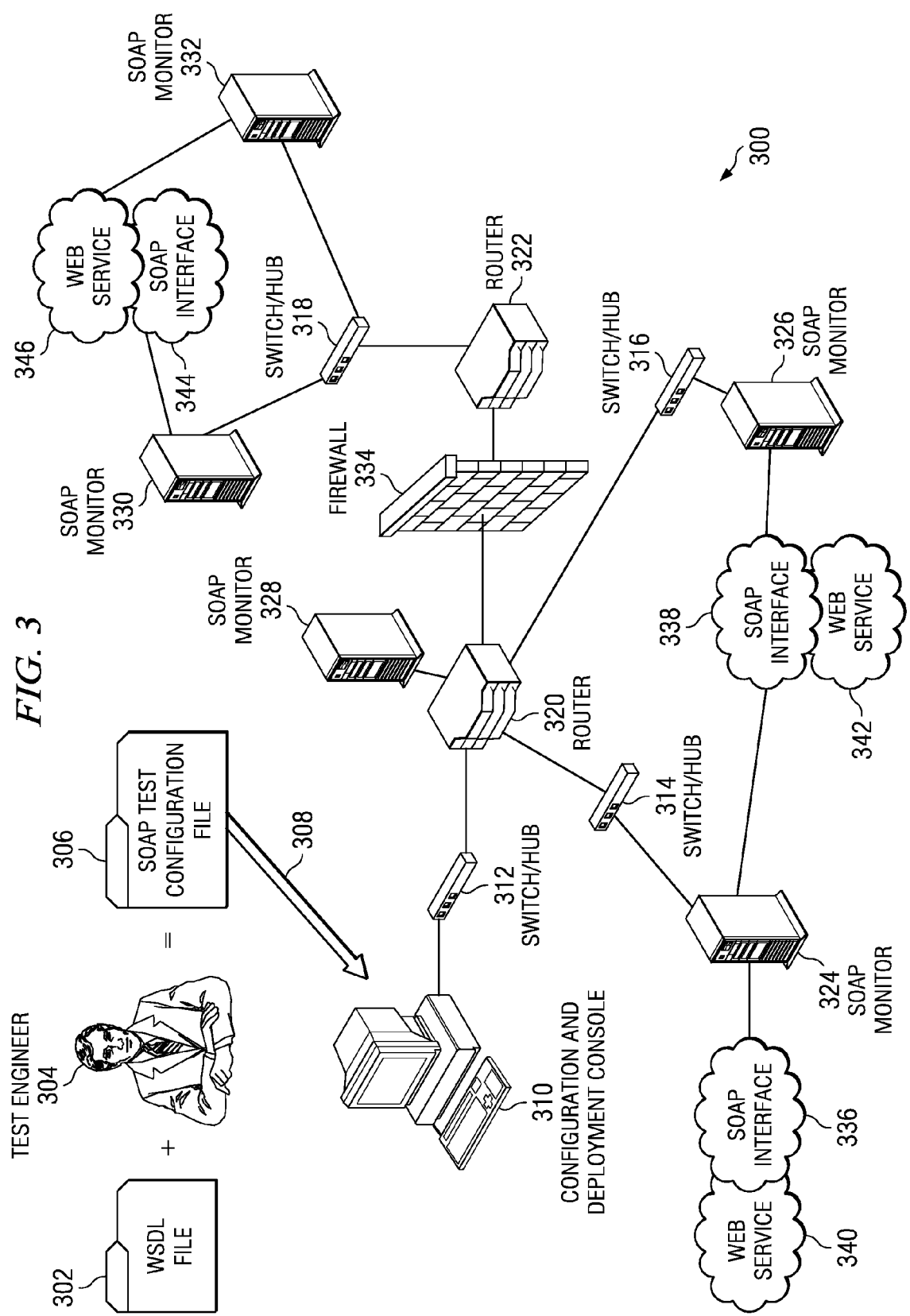
FIG. 3 depicts a system for the distributed monitoring of a service oriented architecture application program interface in accordance with an exemplary embodiment.

FIG. 3 depicts a system for the distributed monitoring of a service oriented architecture application program interface in accordance with an exemplary embodiment. System 300 comprises WSDL file 302, test engineer 304, SOAP test configuration file 306, configuration and deployment console 310, SOAP monitors 324, 326, 328, 330, and 332, switch/hubs 312, 314, 316, and 318, routers 120 and 322, firewall 334, SOAP interface 336, 338, and 344, and web services 340, 342, and 346.

System 300 may be implemented as a network such as network 102 in FIG. 1. Configuration and deployment console 310 and SOAP monitors 324, 326, 328, 330, and 332 may be implemented as data processing system, such as data processing system 200 in FIG. 2.

Test engineer 304 uses WSDL file 302 to create SOAP test configuration file 306. AS indicated by arrow 308, SOAP test configuration file 306 is uploaded to configuration and deployment console 310. Configuration and deployment console 310 deploys SOAP test configuration file 306 to SOAP monitors 324, 326, 328, 330, and 332.

Configuration and deployment console 310 deploys SOAP test configuration file 306 to SOAP monitors 330 and 332 via firewall 334. Firewall 334 prevents outside access to SOAP monitors 330 and 332, SOAP interface 344 and web service 346. Thus, normally, test engineer 304 could not test SOAP test configuration file 306 in this protected network or environment. However, firewall 334 has an pre-established exception, referred to as a hole, that allows configuration and deployment console 310 to communicate with the environment or network protected by firewall 334.

In an alternate embodiment, firewall 334 only allows configuration and deployment console 310 to communicate with a single data processing system behind firewall 334. This single data processing system must then act to deploy SOAP test configuration file 306 to the various SOAP monitors that exist behind firewall 334, collect the results from the SOAP monitors, and communicate the results back to configuration and deployment console 310 through firewall 334.

SOAP monitors 324, 326, 328, 330, and 332 automatically pick up their new configurations and start testing. These tests are re-run automatically at a pre-defined interval. As shown in FIG. 3, SOAP monitors 330 and 332 test web service 346 via SOAP interface 344. SOAP monitor 326 tests web service 342 via SOAP interface 338. SOAP monitor 324 tests web service 340 through SOAP interface 336 and tests web service 342 through SOAP interface 338. SOAP monitor 328 does not have access to an appropriate web service. Thus, when SOAP monitor 328 runs SOAP test configuration file 306, SOAP monitor 328 yields a SOAP fault result. SOAP monitors 324, 326, 328, 330, and 332 report test results to configuration and deployment console 310.

The architecture of FIG. 3 has been presented for purposes of illustration and description, and is not intended to be exhaustive or to limit exemplary embodiments to the architecture depicted. Many modifications and variations will be apparent to those of ordinary skill in the art. For example, system 300 may contain more or less SOAP monitors than depicted. The exemplary embodiment was chosen and described in order to best explain the principles of the embodiments, the practical application, and to enable others of ordinary skill in the art to understand the various embodiments with various modifications as are suited to the particular use contemplated.

Figure 4:
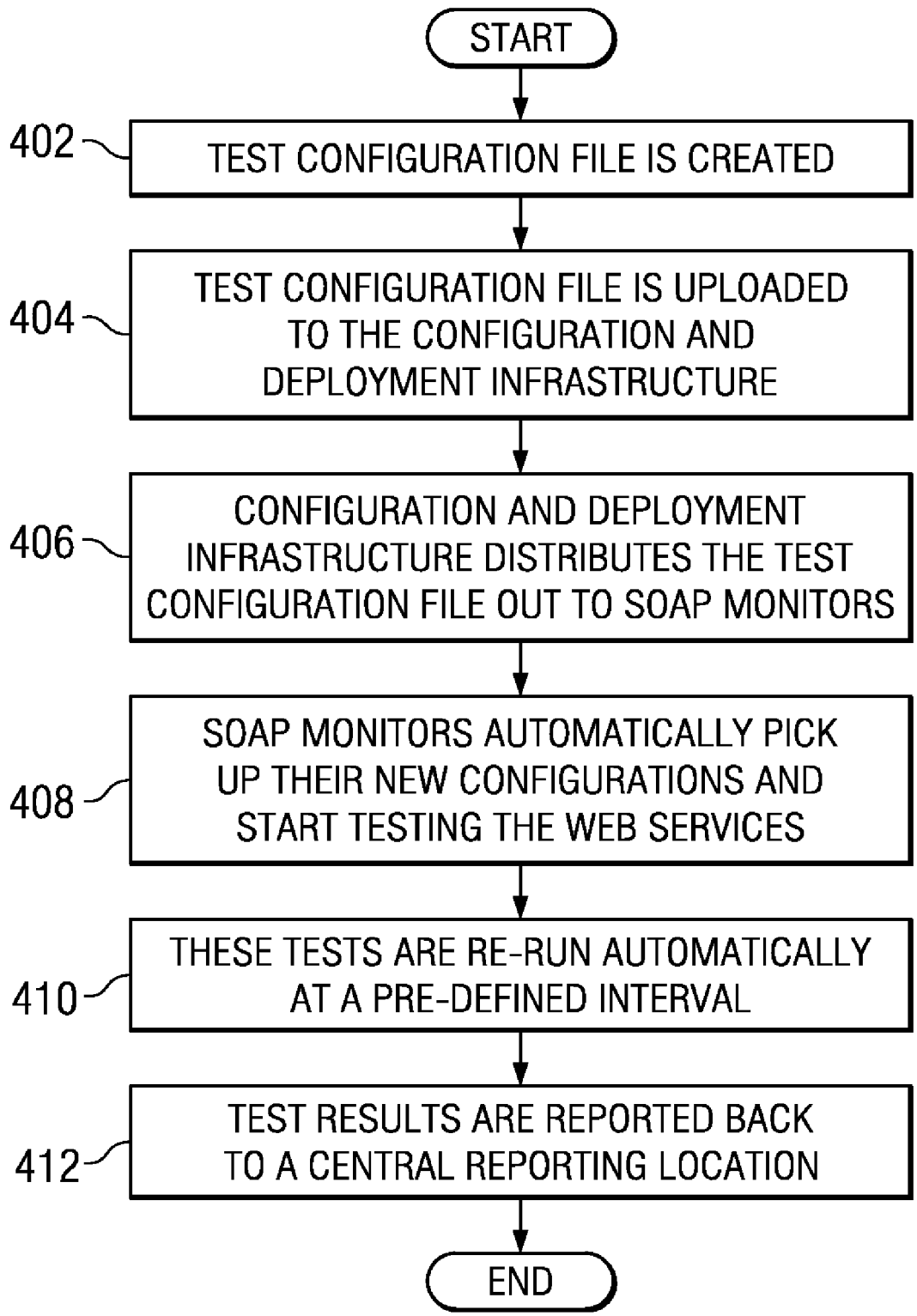
FIG. 4 is a flowchart illustrating the operation of the distributed monitoring of a service oriented architecture application program interface in accordance with an exemplary embodiment.

FIG. 4 is a flowchart illustrating the operation of the distributed monitoring of a service oriented architecture application program interface in accordance with an exemplary embodiment. Steps 402 and 404 may be performed by a user such as test engineer 304 in FIG. 3. Step 406 may be performed by a data processing system, such as configuration and deployment console 310 in FIG. 3. Steps 408 through 412 may be preformed by a SOAP monitor such as SOAP monitor 324 in FIG. 3.

The operation begins when a configuration file is created (step 402). The configuration file may be created manually, using the WSDL as a reference, or automatically, using scripting combined with the WSDL. The configuration file contains the details of the tests to be performed on the SOAP interface. These tests are based on a previously obtained WSDL file without the need to access the live SOAP service. The creation of the configuration file may be a non-interactive, non-iterative, single-step configuration process.

The test configuration file is uploaded to the configuration and deployment infrastructure (step 404). The configuration and deployment infrastructure distributes, or "pushes," the test configuration file out to pre-installed SOAP monitors (step 406). The pre-installed SOAP monitor locations could possibly be inside firewalled networks and not be accessible from outside the firewalled network. Typically, there would be "holes" in the firewall made for the configuration and deployment infrastructure. These "holes" allow the distributed deployment of tests to the network and SOAP monitors that exist behind the firewall.

The SOAP monitors automatically pick up their new configurations and start testing the web services from remote, distributed locations (step 408). These tests are re-run automatically at a pre-defined interval (step 410). Test results are reported back to a central reporting location (step 412) and the operation ends.

The test results may be communicated back to the central location via any appropriate means, including wireless transmission. In an exemplary embodiment, the test results are communicated back to the central location via the configuration and deployment infrastructure.

Figure 5:
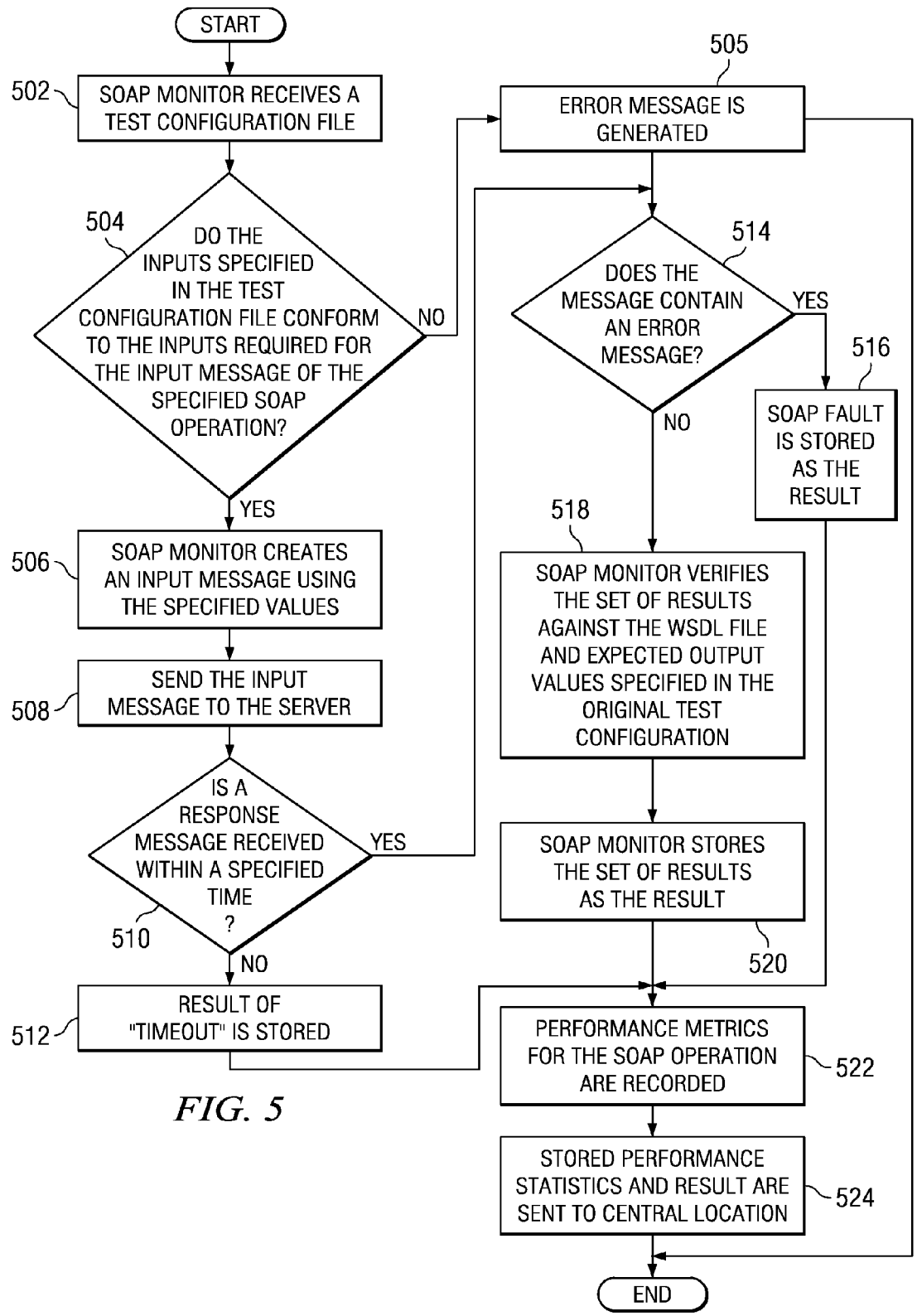
FIG. 5 is a flowchart illustrating the operation of testing SOAP API in a distributed system in accordance with a preferred embodiment.

FIG. 5 is a flowchart illustrating the operation of testing SOAP API in a distributed system in accordance with a preferred embodiment. FIG. 5 is an expanded view of steps 408 through 412 of FIG. 4. The operation of FIG. 5 may be performed by a SOAP monitor such as SOAP monitor 324 of FIG. 3. The operation begins when a SOAP monitor receives a test configuration file (step 502). A determination is made as to whether the inputs specified in the test configuration file conform to the inputs required for the input message of the specified SOAP operation (step 504). The determination is made by the SOAP monitor reading the WSDL file associated with SOAP operation to be tested and verifying that the inputs specified in the test configuration file conform to the inputs required for the input message of the specified SOAP operation. A WSDL file specifies the number, type, and constraints on inputs and outputs of a SOAP device. Therefore, a WSDL file will validate a range of inputs. If the SOAP monitor determines that the inputs specified in the test configuration file do not conform to the inputs required for the input message of the specified SOAP operation (a "no" output to step 504), an appropriate error message is generated (step 505) and the operation ends.

If the SOAP monitor determines that the inputs specified in the test configuration file do conform to the inputs required for the input message of the specified SOAP operation (a "yes" output to step 504), the SOAP monitor creates an input message using the specified values (step 506) and sends the input message to the server (step 508). The SOAP monitor determines whether a response message is received within a specified time (step 510). If the SOAP monitor does not receive a response within the specified time (a "no" output to step 510), a result of "timeout" is stored (step 512) and the operation proceeds to step 522.

If the SOAP monitor does receive a response within the specified time (a "yes" output to step 510), a determination is made as to whether the message contains an error message, a SOAP fault (step 514). If the message contains an error message (a "yes" output to step 514), the SOAP fault is stored as the result (step 516). Performance statistics for the SOAP operation are recorded (step 522). Performance statistics are provided wherever possible. If a SOAP fault occurs, then the error message is accompanied by performance statistics, because at least the time taken to connect to the server, perform the request and receive the error message are known. Some examples of performance statistics include, but are not limited to, time taken to resolve server address, time taken to connect to server, time difference between sending of a request and receiving of a response, and an amount of data transferred between client and server.

If the message does not contain an error message, and therefore contains a set of results (a "no" output to step 514), the SOAP monitor verifies the set of results against the WSDL file and expected output values specified in the original test configuration (step 518). If the results do not match the WSDL file and expected output values specified in the original test configuration, a related error will be generated and stored as the response. The SOAP monitor stores the set of results as the result (step 520) and proceeds to step 522. The stored performance statistics and result are sent to a central location (step 524) and the operation ends.

Thus, exemplary embodiments cure the deficiencies of the prior art in regards to SOAP API testing methods. Exemplary embodiments replace the interactive creation of the test by allowing the designer to write the tests using the web services description file associated with the SOAP API. Designers obtain the WSDL (Web Service Description Language) description file either by already having the file as a result of creating the server interface, or designers may retrieve the file from the live service, or designers may obtain the file from the original service developer. This manual test creation does not require live interaction with the web site. Thus, tests can be automatically deployed across a distributed testing infrastructure with no additional configuration of the tests required. These tests then report back to a central location on the correctness, performance metrics, and alerts. Once the WSDL file is obtained, a trained SOAP professional developer can create the required tests without having or needing access to the network hosting the web service that requires testing.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include storage media, recordable media, a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for a distributed monitoring of a SOAP service, the computer implemented method comprising:
   distributing a test configuration file specifying a test input from a central reporting location to at least one remote data processing system that has access to a SOAP service to be tested, wherein the test configuration file is created without accessing the SOAP service to be tested, and wherein a user that created the test configuration file is not allowed access to the SOAP service to be tested, wherein the at least one remote data processing system is protected by a firewall; and
   wherein the firewall prevents the central reporting location from accessing the SOAP service to be tested and wherein the firewall comprises a predefined exception for the central reporting location that allows the central reporting location to communicate with a deployment data processing system behind the firewall, and the deployment data processing system distributes the test configuration file to the at least one remote data processing system.

2. The computer implemented method of claim 1, further comprising steps performed by the at least one data processing system of:
   receiving the test configuration file for the SOAP service to be tested;
   verifying that the test input conforms to an input required for an input message of the SOAP service to be tested;
   testing an operation of the SOAP service to be tested utilizing the test configuration file;
   verifying that a test output conforms to an expected output from the test configuration file;
   re-testing, periodically, the operation of the SOAP service to be tested;
   storing results of the testing and of the re-testing; and
   sending the results to the central reporting location.

3. The computer implemented method of claim 2, further comprising:
   accessing a Web Service Description Language (WSDL) file associated with the SOAP service to be tested; and
   wherein the test configuration file is based on the Web Service Description Language (WSDL) file.

4. The computer implemented method of claim 2, further comprising:
   displaying the results.

5. The computer implemented method of claim 2, wherein the results comprise at least one of a time taken to resolve a server address, a time taken to connect to a server, a time difference for sending a request and receiving a response, and an amount of data transferred between a client and a server.

6. The computer implemented method of claim 1, wherein direct network access from the central reporting location to the SOAP service is restricted due to network security restrictions.

7. A computer program product comprising:
a computer recordable medium having computer usable program code for a distributed monitoring of a SOAP service, the computer program product comprising:
computer usable program code for distributing a test configuration file specifying a test input from a central reporting location to at least one remote data processing system that has access to a SOAP service to be tested, wherein the test configuration file is created without accessing the SOAP service to be tested, and wherein a user that created the test configuration file is not allowed access to the SOAP service to be tested, wherein the at least one remote data processing system is protected by a firewall; and
wherein the firewall prevents the central reporting location from accessing the SOAP service to be tested and wherein the firewall comprises a predefined exception for the central reporting location that allows the central reporting location to communicate with a deployment data processing system behind the firewall, and the deployment data processing system distributes the test configuration file to the at least one remote data processing system.

8. The computer program product of claim 7, further comprising:
computer usable program code for receiving, by the at least one remote data processing system, the test configuration file for the SOAP service to be tested;
computer usable program code for verifying, by the at least one remote data processing system, that the test input conforms to an input required for an input message of the SOAP service to be tested;
computer usable program code for testing, by the at least one remote data processing system, an operation of the SOAP service to be tested utilizing the test configuration file;
computer usable program code for verifying, by the at least one remote data processing system, that a test output conforms to an expected output from the test configuration file;
computer usable program code for re-testing, periodically by the at least one remote data processing system, the operation of the SOAP service to be tested;
computer usable program code for storing, by the at least one remote data processing system, results of the testing and of the re-testing; and
computer usable program code for sending, by the at least one remote data processing system, the results to the central reporting location.

9. The computer program product of claim 8, further comprising:
computer usable program code for accessing a Web Service Description Language (WSDL) file associated with the SOAP service to be tested; and
wherein the test configuration file is based on the Web Service Description Language (WSDL) file.

10. The computer program product of claim 8, further comprising:
computer usable program code for displaying the results.

11. The computer program product of claim 8, wherein the results comprise at least one of a time taken to resolve a server address, a time taken to connect to a server, a time difference for sending a request and receiving a response, and an amount of data transferred between a client and a server.

12. The computer program product of claim 7, wherein direct network access from the central reporting location to the SOAP service is restricted due to network security restrictions.

13. A data processing system for the distributed monitoring of a SOAP service, the data processing system comprising:
a bus;
a communications unit connected to the bus;
a storage device connected to the bus, wherein the storage device includes computer usable program code; and
a processor unit connected to the bus, wherein the processor unit executes the computer usable program code to distribute a test configuration file specifying a test input from a central reporting location to at least one remote data processing system that has access to a SOAP service to be tested, wherein the test configuration file is created without accessing the SOAP service to be tested, and wherein a user that created the test configuration file is not allowed access to the SOAP service to be tested, wherein the at least one remote data processing system is protected by a firewall; and
wherein the firewall prevents the central reporting location from accessing the SOAP service to be tested and wherein the firewall comprises a predefined exception for the central reporting location that allows the central reporting location to communicate with a deployment data processing system behind the firewall, and the deployment data processing system distributes the test configuration file to the at least one remote data processing system.

14. The data processing system of claim 13, wherein the at least one data processing system executes data processing system computer useable program code to receive the test configuration file for the SOAP service to be tested; verify that the test input conforms to an input required for an input message of the SOAP service to be tested; test an operation of the SOAP service to be tested using the test configuration file; verify that a test output conforms to an expected output from the test configuration file; re-test, periodically, the operation of the SOAP service to be tested; store results of the testing and of the re-testing; and send the results to the central reporting location.

15. The data processing system of claim 14, wherein the processor further executes the computer useable program code to access a Web Service Description Language (WSDL) file associated with the SOAP service to be tested; and wherein the test configuration file is based on the Web Service Description Language (WSDL) file.

16. The data processing system of claim 14, further comprising:
a display connected to the bus, wherein the display displays the results.

17. The data processing system of claim 13, wherein direct network access from the central reporting location to the SOAP service is restricted due to network security restrictions.

* * * * *